United States Patent [19]

Diprose et al.

[11] 4,250,747
[45] Feb. 17, 1981

[54] HEAT METERS

[75] Inventors: Kenneth V. Diprose, Bath; Arthur S. Forbes, Yatton, both of England

[73] Assignee: ISS Clorius Limited, Bristol, England

[21] Appl. No.: 956,268

[22] Filed: Oct. 31, 1978

[30] Foreign Application Priority Data

Oct. 31, 1977 [GB] United Kingdom .......... 45242/77

[51] Int. Cl.³ .................................. G01K 17/16
[52] U.S. Cl. ............................ 73/193 R; 364/510
[58] Field of Search ........... 73/193 R; 364/510, 557, 364/846

[56] References Cited

U.S. PATENT DOCUMENTS

| | | | |
|---|---|---|---|
| 1,267,758 | 5/1918 | Gibson | 73/193 |
| 3,842,669 | 10/1974 | Iversen | 73/193 |
| 3,872,722 | 3/1975 | Karlsson | 73/193 |
| 4,048,852 | 9/1977 | Sakakibara | 73/193 |

FOREIGN PATENT DOCUMENTS

| | | | |
|---|---|---|---|
| 1247036 | 10/1960 | France | 73/193 |
| 663083 | 7/1948 | United Kingdom | 73/193 |
| 802017 | 9/1958 | United Kingdom . | |
| 1040025 | 8/1966 | United Kingdom . | |
| 1179911 | 2/1970 | United Kingdom . | |
| 1331200 | 9/1973 | United Kingdom . | |
| 1396721 | 6/1975 | United Kingdom . | |

*Primary Examiner*—Herbert Goldstein
*Attorney, Agent, or Firm*—Young & Thompson

[57] ABSTRACT

A heat meter comprises a transducer (6) for measuring the rate of flow of water through a conduit (58) and a transducer (10) for measuring the temperature difference between two spaced locations (90, 92) of the conduit (58). The output of the flow rate transducer (6) is supplied as an input to the temperature difference measurement transducer (10) and the output of the temperature difference measurement transducer (10) is supplied to a digital display unit (14) to display the amount of thermal power exchanged with the water between the two spaced locations.

11 Claims, 13 Drawing Figures

WATER FLOW

HEAT METERS

DESCRIPTION

This invention relates to heat meters.

The invention finds particular though not exclusive application in the measurement of the amount of thermal power supplied to a hot water radiator system, for domestic use for example.

It is an object of the invention to provide an entirely passive meter that is capable of working over a wide range of operating parameters without giving rise to a large pressure drop at high fluid flow rates and without ceasing to function at low flow rates.

In accordance with the present invention, there is provided a heat meter comprising means for obtaining a measurement representative of rate of flow of a fluid, means for obtaining a measurement representative of difference in temperature of the fluid between two spaced locations, and means for applying as an input signal to one of the measurement means a signal that is representative of an output signal of the other measurement means, whereby an output signal obtained from said one measurement means is representative of the amount of heat transferred to or from the fluid between said two spaced locations.

Preferably an output signal from the flow rate measurement means is applied as an input signal to the temperature difference measurement means.

In a preferred embodiment the invention provides a heat meter in which the flow rate of a fluid passing therethrough and the difference in temperature between the incoming and outgoing fluid are measured electrically without interposing any obstacle in the way of the flow. The flow rate and temperature difference are multiplied in such a way that no extra inaccuracy is introduced beyond the individual errors of the flow rate and temperature difference transducers employed.

If the fluid is electrically conductive, the flow rate measurement means may be electromagnetic induction apparatus comprising means for subjecting the fluid to a magnetic field and electrode means for detecting the voltage thereby induced in the fluid. Preferably the magnetic field is applied intermittently, thereby to minimise the effect of polarisation of the fluid and to conserve electrical power.

The temperature difference measurement means may comprise a pair of temperature-sensitive resistors, preferably platinum film sensors, connected in an electrical bridge arrangement.

It is another object of the invention to provide a heat meter comprising an electromagnetic flow rate measuring means and electro-resistance temperature measurement means in which the effect of variation in the supply voltage and in the resistance of the field coils is minimised.

Accordingly, in a preferred embodiment this latter object is achieved by regulating the magnetic field supplied to the field coils of the flow rate measuring means such that a feedback signal in a control circuit thereof is proportional to the current in the field coils.

Heat meters in accordance with the present invention, and for use with a hot water radiator system, will now be described, by way of example, with reference to the accompanying drawings, in which.

Figure 1:
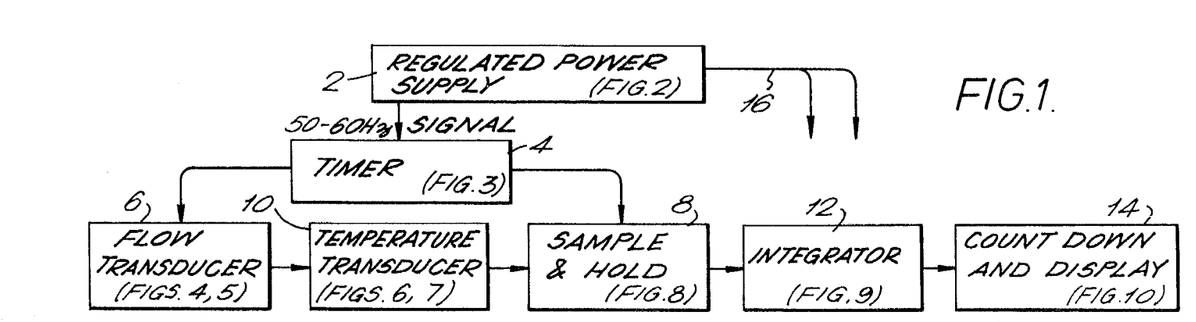
FIG. 1 is a block diagram of a heat meter system.

Referring to FIG. 1, a mains-operated power supply 2 passes a mains-frequency signal to a timer unit 4 that is arranged to control the timing of the operation of a flow transducer 6 and a sample-and-hold unit 8. The power supply 2 also supplies power along a conductor 16 for use in various components as described hereinafter. The output from the flow transducer 6 is supplied as an input to a temperature transducer 10, and the output from the transducer 10 after having passed through the sample-and-hold unit 8 is integrated in an integrator 12. The output of the integrator 12 is supplied to a count-down and display unit 14.

The flow transducer 6 determines the rate of flow of water through the radiator system, and the temperature transducer 10 determines the decrease in temperature of the water therein. These two values are combined and the resultant, which is a measure of the heat supplied to the radiator system is displayed by the unit 14.

Each of the components of the heat meter system of FIG. 1 will now be described in more detail.

Figure 2:
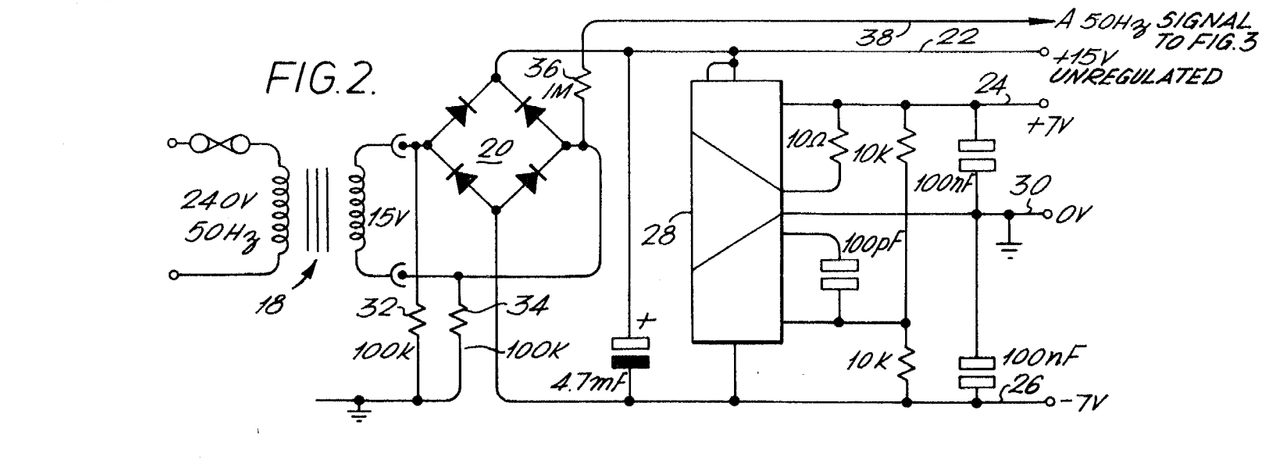
FIGS. 2 and 3 are detailed electrical circuit diagrams of the power supply and timer unit respectively of FIG. 1.

Referring to the power supply unit 2 shown in FIG. 2, the output from a mains transformer 18 is supplied through a full-wave rectifier 20 so as to supply a 15-volt unregulated d.c. supply on line 22 which is used to provide intermittent current to the flow transducer 6 and an electromagnetic counter of the count-down and display unit 14, and a regulated power supply of ±7 volts on lines 24 and 26 respectively.

The power supply 2 contains an integrated circuit 28 that comprises two operational amplifiers which control an earth line 30 with respect to the regulated supply lines 24 and 26 respectively. The power supply 2 is arranged to provide a current output of 2 milliamp on the earth line 30 and 20–25 milliamps on the +7 volt line 24. Resistors 32, 34 and 36 provide a 50 Hz low-power timing signal A on line 38, which is supplied to the timer unit 4 of FIG. 3.

Figure 3:
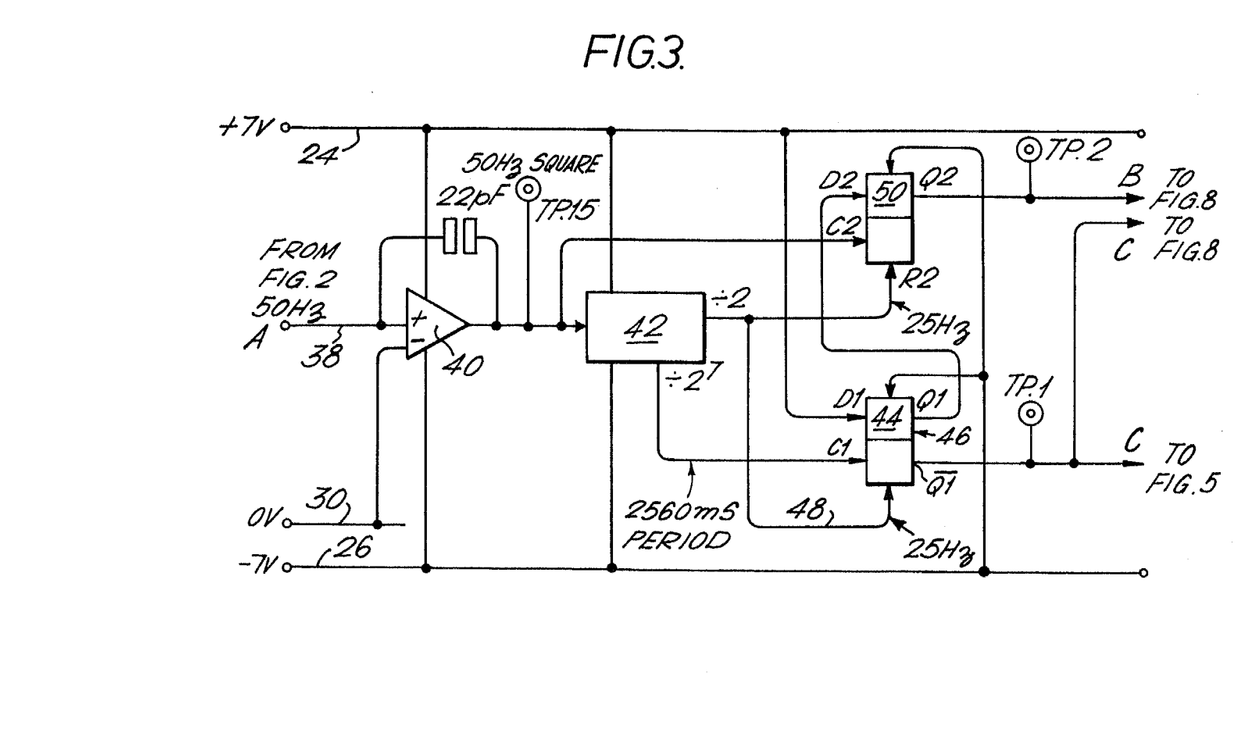
Figure 11:
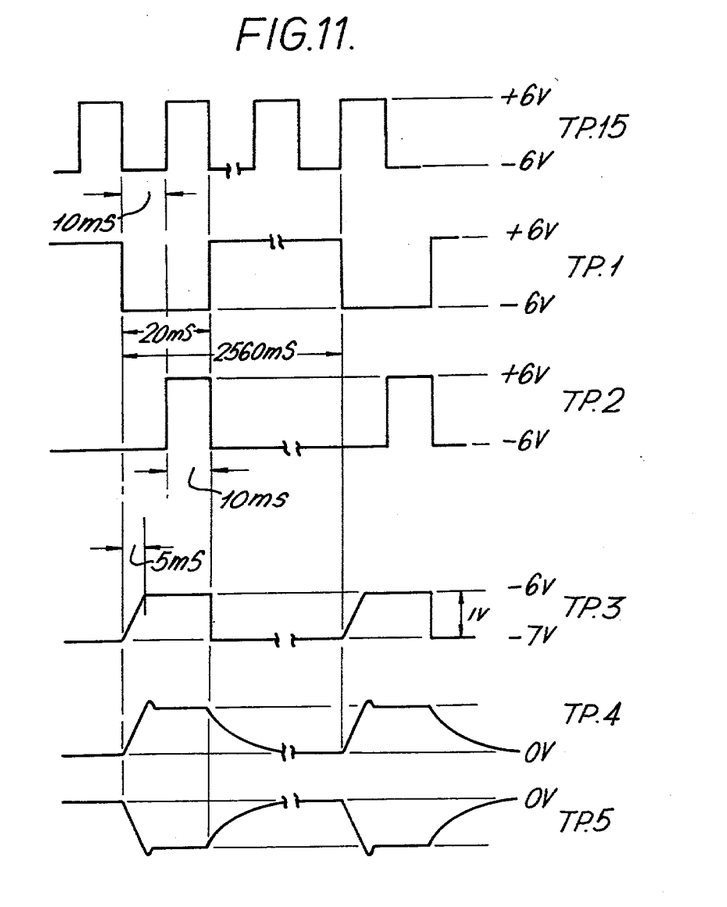
FIGS. 11, 12 and 13 show waveforms at various test points of the electrical circuit of the heat meter system.

Referring to the timer unit 4 shown in FIG. 3, the timing signal A on the line 38 from the power supply 2 is supplied as an input to an amplifier 40 which converts the 50 Hz sine wave signal A into a square wave was fast rise and fall times. The square wave is fed to a 7-stage binary counter 42 which provides a square wave of 2,560 millisecond period which is used to clock a first flip-flop 44 in an integrated circuit 46. The flip-flop 44 is reset by a 25 Hz signal on line 48 which is supplied from the first stage of the binary counter 42. An output signal C is provided from terminal Q1 of the integrated circuit 46. The waveform at a tapping point TP1 of the signal C is shown in FIG. 11, from which it is seen that C is low for only 20 milliseconds. in every 2,560 milliseconds. The integrated circuit 46 is shown split into discrete components for convenience, and it is seen that the output on terminal Q1 of flip-flop 44 is supplied as the input signal to a second flip-flop unit 50. The flip-flop 50 is clocked with a 50 Hz input signal taken from the output of the amplifier 40 and shown at test point TP15 in FIG. 11. The resultant output B on the flip-flop 50 is shown at test point TP2 in FIG. 11, from which it is seen that signal B is high only for the second 10 milliseconds of the signal C at test point TP1 (FIG. 11).

Figure 5:
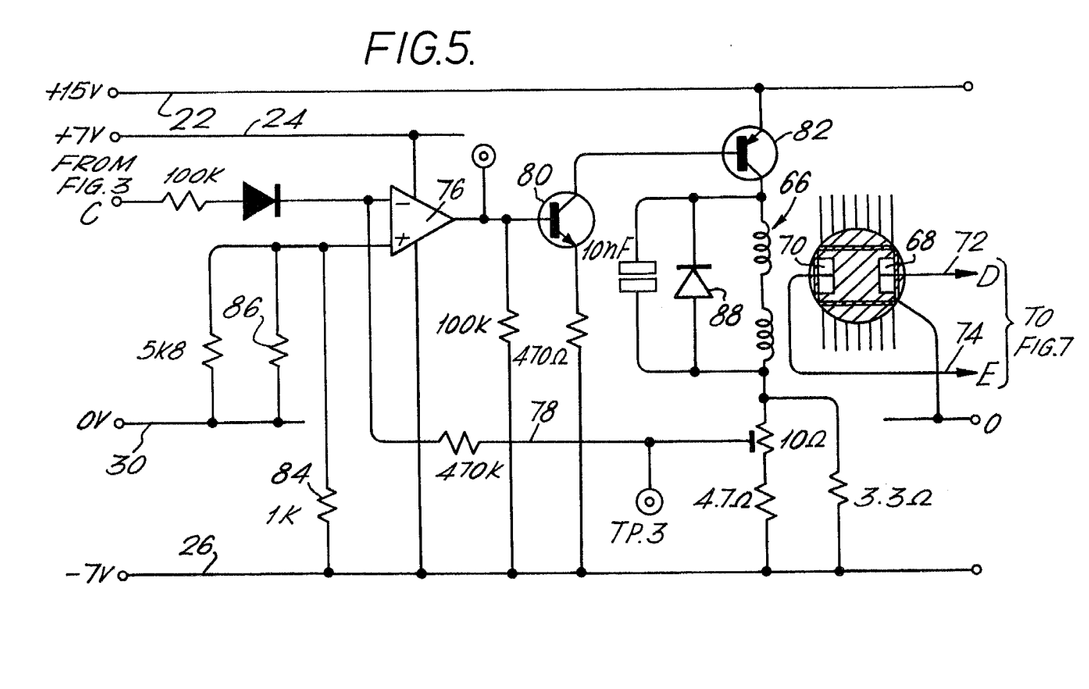
FIG. 5 is a detailed electrical circuit diagram of the flow transducer of FIG 1.

The output signal B from the timer unit 4 is supplied to the temperature transducer 10, and the output signal C as well as being supplied to the temperature transducer 10 is also supplied to the flow transducer 6 of FIG. 5.

Figure 4:
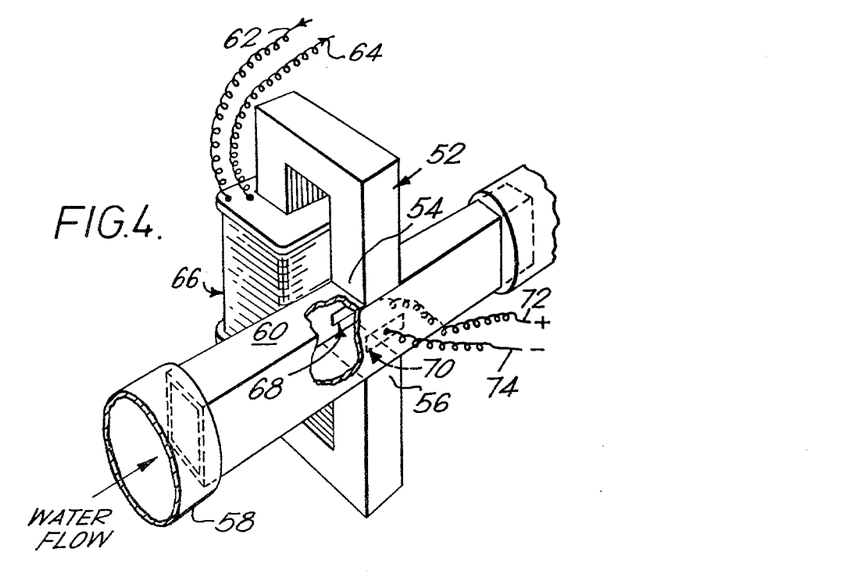
FIG. 4 shows schematically the mechanical construction of the flow transducer of FIG. 1.

Referring to FIG. 4, the flow transducer 6 is an electromagnetic flow transducer in which a magnetic core 52 is disposed so as to place two poles 54 and 56 thereof on opposite sides of a water pipe 58.

Although the pipe 58 is generally cylindrical, the cross-section between the poles 54 and 56 is made rectangular in order to reduce inaccuracy of the measurement due to non-uniform flow of water over the cross-section. The transition from the circular cross-section of the stainless steel pipe 58 to a rectangular section of electrically-insulative material is achieved by using an insulating moulded plastics liner 60 the pipe 58 carries the stresses due to the hydraulic pressure and also satisfies the two requirements that it should be non-magnetic and of high electrical resistivity. Additionally, the uniformity of the water flow profile is improved by disposing a venturi at the inter-pole gap so as to increase the flow velocity, and thus increase the output signal of the transducer 6 for a given flow through the pipe 58.

Conductors 62 and 64 supply current to a coil 66 wound around one limb of the core 52, and this results in a magnetic field being set up in the water electrolyte between the poles 54 and 56. The pair of electrodes 68 and 70 are disposed within the insert 60 such that their inter-electrode gap extends transversely of the magnetic field. Flow of the electrically-conductive liquid through the magnetic field induces between the electrodes 68 and 70 a voltage that is dependent on the velocity of the liquid. Conductors 72 and 74 are connected to the electrode 68 and 70 respectively so as to provide a path for an output signal from the transducer 6 which is dependent on the rate of flow of the water through the pipe 58.

It will be appreciated that the voltage signal carried by the conductors 72 and 74 can be made proportional to the water flow velocity only, that is to say to be unaffected by the density, viscosity, conductivity, pressure or temperature of the liquid flowing in the pipe 58, if the current drawn from the water by the external electrical circuit (FIG. 5) is small. The induced voltage can be expressed, in a known way, as:

$$V = K \times B \times V \times D,$$

where V = induced voltage, K = constant, B = strength of the magnetic field, V = velocity of the liquid, and D = separation of the electrodes 68 and 70.

In order to minimise errors in the measurement of the flow rate which arise from polarisation at the interfaces between the electrodes and the water, and also in order to minimise the operating power of the transducer 6, current is supplied to the coil 66 intermittently, and the change in the induced voltage on the conductors 72 and 74 with the magnetic field on and the magnetic field off is measured.

Referring to FIG. 5, showing the circuit diagram of the flow transducer 6, the field coil 66 creates a uniform magnetic field of about 0.5 Tesla over a 20 millimeter length of the pipe insert 60. This is sufficient to induce a potential difference of 0.7 millivolt per meter per second mean flow velocity. The field is kept constant by making the feedback signal from the coil 66 to a controlling operational amplifier 76 along line 78 proportional to the current in the field coil 66. Such regulation ensures that any variation in supply voltage or in the resistance of the field coil 66 does not affect the voltage on the conductors 72 and 74. Furthermore, it allows the provision of a magnetic flux which is constant for a period of about 15 milliseconds. Although such regulation does not cancel out any change in the permeability of magnetic circuit of the transducer 6, such changes are usually negligible.

The intermittent energisation of the magnetic field is achieved by switching the field current on and off by means of the timing signal C through an integrated circuit amplifier 76 and transistors 80 and 82. During the "on" period, the current rises unchecked until after about 5 milliseconds the voltage fed back to the amplifier 76 is equal to the voltage across resistor 84, which is set to be one volt by appropriate choice of value of resistor 86. At this stage in the cycle the amplifier 76 controls the current so that the voltage at test point TP3 on conductor 78 remains at one volt above the negative conductor 26, as shown in FIG. 11. After the current is switched off by timing signal C, it decays exponentially but is diverted through the shorting diode 86 so that the decay is not evident at test point TP3.

In order to determine the amount of heat transferred to the radiator system, the rate of flow of the water therethrough as determined by the flow meter of FIGS. 4 and 5 has to be combined with the decrease in temperature of the water. The measurement of the decrease of the water temperature will now be described with reference to FIGS. 6 and 7.

Figure 6:
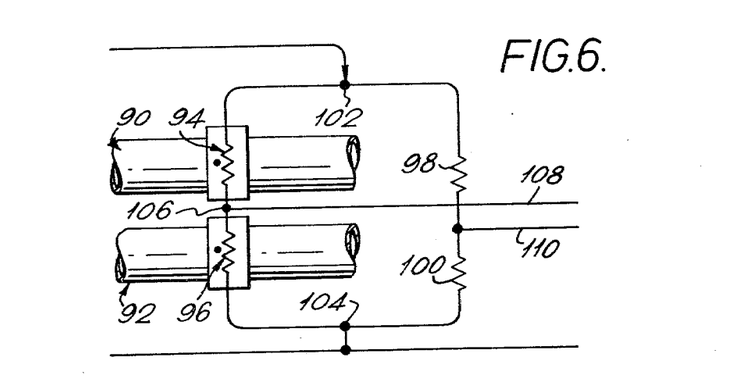
FIG. 6 shows schematically the mechanical construction of the temperature transducer of FIG. 1.

The supply of hot water to the radiator system is conducted through a first pipe portion 90 and the cooler water leaving the radiator system is conducted by a second pipe portion 92. The portions 90 and 92 are part of the pipe 58 that is used for the flow rate measurement. Temperature sensitive resistors 94 and 96 are arranged to sense the temperature of the water in the pipe portions 90 and 92 respectively. Resistors 94 and 96, which are platinum film sensors, form two arms of a Wheatstone bridge, of which two fixed resistors 98 and 100 form the other two arms. Current is supplied to the bridge between the junction 102 of resistors 94 and 98 and the junction 104 of resistors 96 and 100. The junction 106 between resistors 94 and 96, and a taping point along the resistor chain 98/100 are connected to conductors 108 and 110 respectively to provide the output signal from the temperature bridge circuit. The temperature bridge circuit will now be described in more detail with reference to FIG. 7.

Figure 7:
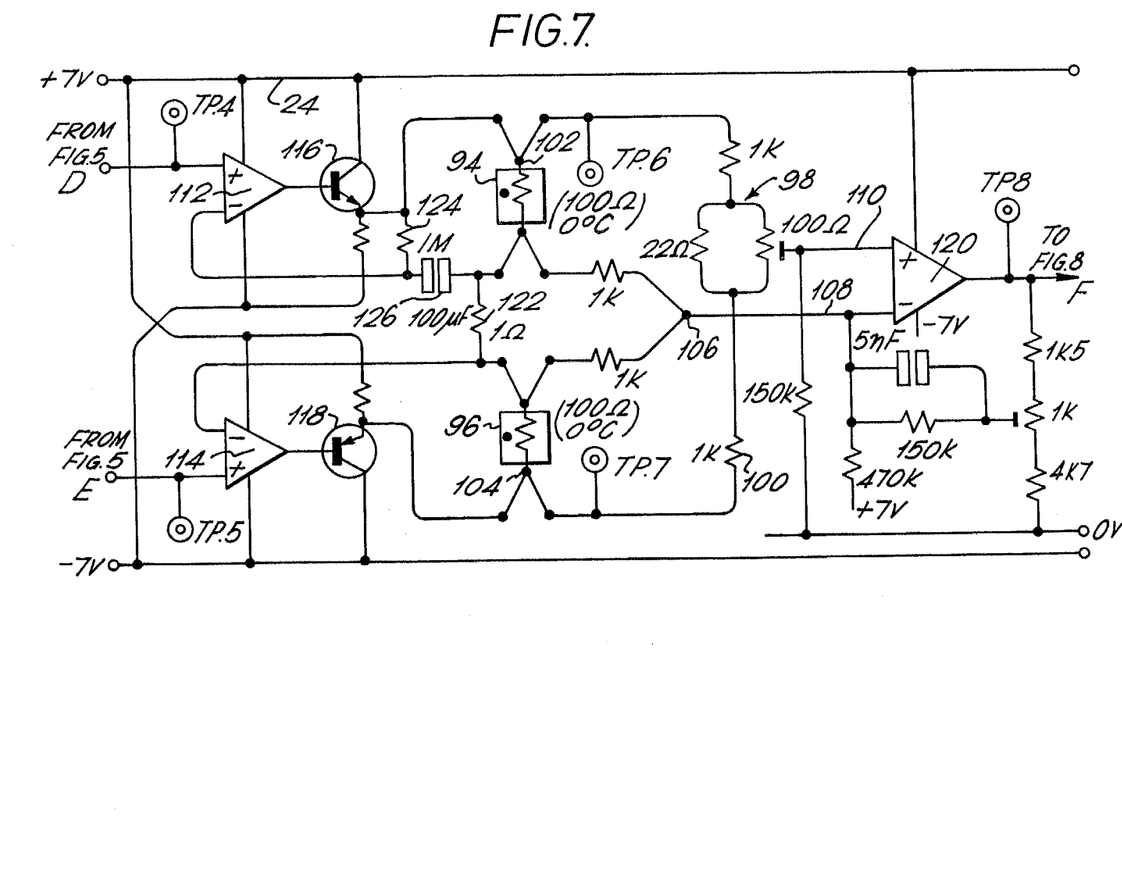
FIG. 7 is a detailed electrical circuit diagram of the temperature transducer of FIG. 1.

Integrated circuit amplifiers 112 and 114 receive the signals D and E (test points TP4 and TP5 respectively, in FIG. 11) from the flow meter circuit of FIG. 5, and the amplified signals are passed via transistors 116 and 118 through the hot and cold temperature sensors 94 and 96. Resistor 122 interconnecting the hot and cold sensors 94, 96 ensures that the sensor current is proportional to the voltage from the electrodes 68 and 70 of the flow meter 6. By this means, the current through the temperature sensors is controlled such that it is proportional to the voltage analogue of the flow rate signal D/E. When the current through the temperature sensors is controlled in this way the voltage drop across each temperature sensor is proportional to the respective resistance. Accordingly the out-of-balance voltage signal from the bridge which is applied via conductors 108, 110 to an integrated circuit amplifier 120 is proportional to the product of the electric analogue of the water flow and the temperature difference between the hot and cold sensors. The amplification by amplifier 120 is arranged such that every 100 millivolt of its output signal F corresponds to a transfer of 1 kilowatt of power to the radiator system.

Figure 12:
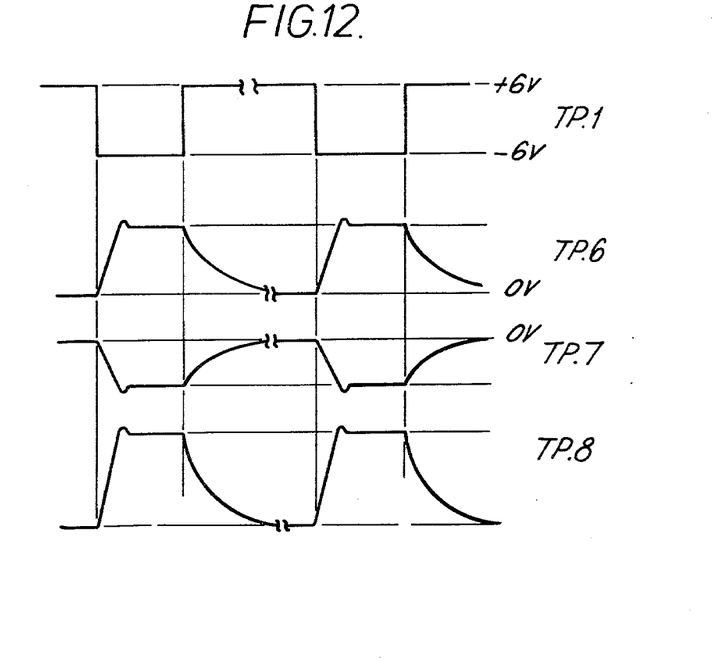

Waveforms representative of the voltage developed across the hot and cold temperature sensors 94 and 96 respectively are shown at test points TP6 and TP7 in FIG. 12.

The signal F, as seen at test point TP8 (FIG. 12) corresponds to the current waveform in the field coil 66 of the flow meter 6 with an amplitude that is proportional to the thermal power.

The multiplication that takes place within the temperature transducer circuit of FIG. 7, combining the outputs from the flow meter and the temperature sensors, is achieved with no extra inaccuracy beyond the individual errors of the temperature transducer and flow transducer taken separately. Furthermore, the inherent non-linearity of a Wheatstone bridge output, which occurs when voltage drive is employed, is completely avoided.

The resistors 124 and capacitor 126 shown in FIG. 7 interconnect with the input amplifiers 112 and 114 so as to provide a feedback loop. This arrangement controls the frequency response of the amplifiers, so that slowly changing voltages, below 0.01 radians per second are attenuated in the ratio 100 to 1 with respect to more rapidly changing voltages. This reduces the effect of any electrochemical noise appearing at the integrated amplifier circuit 120 and also provides an automatic zero correction for the d.c. amplifiers 112 and 114.

As has been explained above, the operation of the flow transducer 6 is pulsed, so that the output F of the circuit of FIG. 7 is also pulsed. The output F, together with the outputs B and C of the timer circuit of FIG. 3 are provided as inputs to the sample-and-hold unit 8, shown in more detail in FIG. 8. The circuit of FIG. 8 measures the height of the thermal power pulse signal F and converts it into a continuous voltage of the same magnitude. The unit 8 is arranged to sample the signal F during the second half of the 20 millisecond pulse shown at test point TP1 (FIG. 11), when the magnetic flux of the flow meter 6 is held constant. The signal F comprises the required thermal power pulse on which is superimposed any residual electrochemical noise together with any d.c. drift of the amplifiers 112, 114 and 120 of the transducer circuit of FIG. 7.

Figure 8:
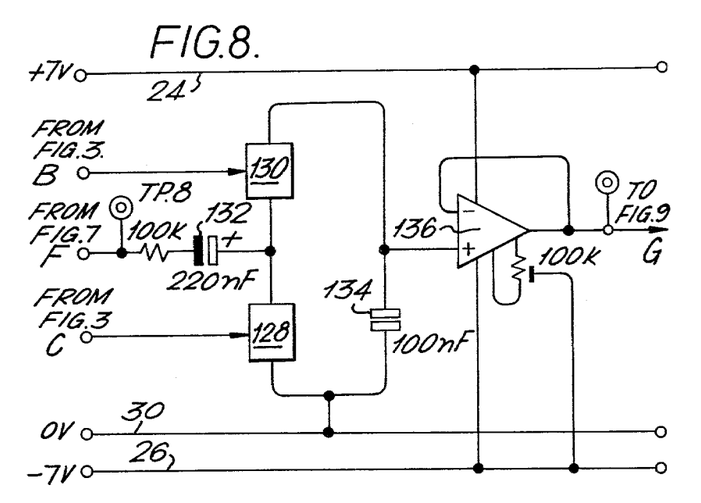
FIGS. 8, 9 and 10 are detailed electrical circuit diagrams of the sample-and-hold unit, integrator unit, and count-down and display unit respectively of FIG. 1.

Switches 128 and 130 form part of a quad-analogue switch. Switch 128 is normally closed so as to maintain the output end of capacitor 132 at earth potential. When the input C from the timer circuit 4 goes low (as shown at test point TP1 in FIG. 11) switch 128 is opened and capacitor 132 is isolated from earth. When input signal B from the timer unit 4 goes positive, as shown at test point TP2 in FIG. 11, switch 130 is closed so that capacitor 132 is connected to a further capacitor 134. At the end of the 20 millisecond period of the timer signal C, the switches 128 and 130 are returned to their original conditions, some of the charge on capacitor 132 having been transferred to capacitor 134, or vice versa. In this way capacitor 134 ultimately requires a potential equal to the height of the pulse of the input signal F from the temperature transducer 10. Capacitor 134 is connected to an integrated circuit amplifier 136 which is a unity gain buffer of extremely high input impedance and low output impedance. The output G of amplifier 136 is a d.c. voltage proportional to the thermal power transferred to the radiator system.

The operation of the switches 128 and 130 results in extraction from the input signal F of the voltage corresponding to the thermal power, the electro-chemical noise and d.c. drift signals referred to above being almost completely ignored.

Figure 9:
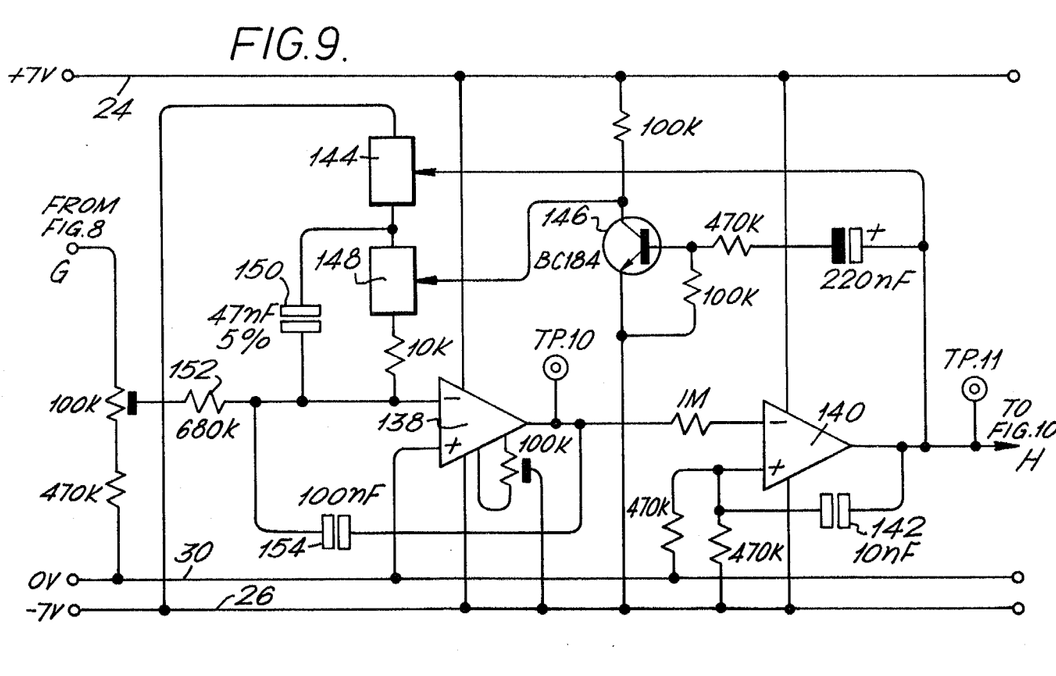
Figure 13:
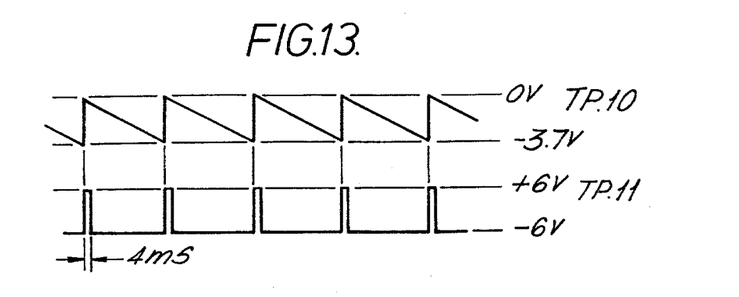

The ouput G of the sample-and-hold unit 8 is supplied to the integrator 12, which will now be described with reference to FIG. 9. The integrator 12 is a voltage-to-frequency converter, the output count of which is proportional to thermal energy. The sample-and-hold input G is supplied to an integrat circuit amplifier 138 which integrates the thermal power signal with a time scale of about 100 milliseconds, that is to say the output of amplifier 138, at test point TP10 (FIG. 13) goes negative at a rate of 10 volts per second for each volt of the signal G. As soon as the integral reaches −3.5 volts, integrated circuit amplifier 140 switches over, and its output goes from −6 volts to +6 volts and remins there for about 4 milliseconds owing to positive feedback supplied via capacitor 142. The output signal H, at test point TP11 (FIG. 13) closes a switch 144 and, by energising a transistor 146, opens a switch 148. The switches 144 and 148, together with switches 128 and 130 of the unit 8 constitute a single quad-analogue switch unit. The operation of switches 144 and 148 injects a fixed charge equal to the negative voltage on conductor 26 multiplied by the value of capacitor 150, into the summing junction of the amplifier 138. This resets the output voltage at test point TP10 of the amplifier 138 to approximately zero volts, and the process is repeated indefinitely.

The advantage of this method of resetting the integrator is that the accuracy of the resetting frequency depends only on the values of input resistor 152, capacitor 150 and the voltage on the conductor 26, and not at all on the value of feedback capacitor 154 or the voltage stability of the comparator amplifier 140.

Figure 10:
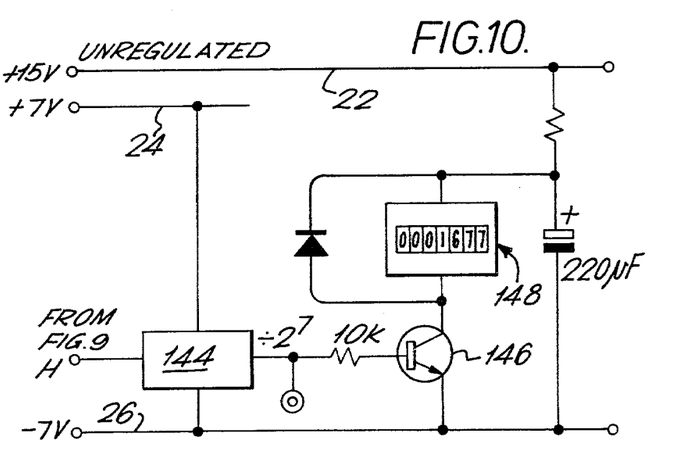

The digital pulses that comprise the output signal H of the integrator 12 form the input of a 7-stage binary counter 144 of the count-down and display unit 14, as shown in FIG. 10. The output of the counter 144 changes from −6 volts to +6 volts once for each every 128 input pulses. Each change switches transistor 146 on, which advances an electro-magnetic counter 148 one step. The counter 148 thus displays in digital form a quantity of thermal energy transferred to the radiator system, and is arranged such that each unit represents 0.1 kilowatt-hour.

It will be appreciated that the heat meters described hereinbefore by way of the sample of the present invention thus provide a representation of the heat energy used by a hot water radiator system, for example, without there being any impedance to the flow of water. Furthermore, the meters may be used with any electrically-conductive fluid, which may be aqueous or non-aqueous, including an electrolytic slurry.

It is also envisaged that devices other than the specific electromagnetic flow transducer and temperature sensitive resistors may be used to sense the flow rate and temperature difference respectively of a fluid.

We claim:

1. A heat meter comprising electromagnetic induction means arranged to provide a measurement representative of rate of flow of fluid, said induction means comprising magnetic pole pieces arranged to be disposed on opposite sides of a conduit carrying said fluid so as to form an interpole gap therebetween, a pair of electrodes arranged to be disposed on opposite sides of said conduit so as to form an interelectrode gap therebetween, said interpole gap extending substantially perpendicular to said interelectrode gap, and means for generating a magnetic field between said pole pieces, said magnetic field generating means comprising an operation amplifier, field coil means magnetically connected with said pole pieces, and means for supplying as a feedback signal to said operational amplifier a signal that is proportional to current flow in said field coil means; means for obtaining a measurement representative of difference in temperature of the fluid between two spaced locations; and means for applying as an input signal to one of said measurement means a signal that is representative of the output signal of the other measurement means, whereby an output signal obtained from said one measurement means is representative of the amount of heat exchanged with the fluid between said two spaced locations.

2. A heat meter according to claim 1, wherein said signal applying means is arranged to apply as said input signal to said temperature difference measurement means an output signal of said flow rate measurement means.

3. A heat meter according to claim 1, wherein said magnetic field generating means is arranged to energise said pole pieces intermittently.

4. A heat meter according to any of claims 3, comprising means defining said inter-pole gap and said interelectrode gap as gaps of substantially rectangular cross-section.

5. A heat meter according to claim 1, wherein said temperature difference measurement means comprises temperature-sensitive resistive means.

6. A heat meter according to claim 5, wherein said temperature-sensitive resistance means comprises two platinum film sensors arranged in a Wheatstone bridge circuit.

7. A heat meter comprising a conduit for conducting flow of fluid; means for obtaining a measurement representative of rate of flow of said fluid through the conduit, said flow rate measurement means comprising means for generating a substantially unidirectional magnetic field across said conduit, and a pair of planar electrodes mounted in the conduit to extend parallel to said magnetic field; means for obtaining a measurement representative of difference in temperature of the fluid between two spaced locations, said temperature measurement means comprising temperature-sensitive resistance means that is arranged to form part of a Wheatstone bridge circuit; means arranged to supply current to the temperature-sensitive resistance means in proportion to the voltage induced between said electrodes; display means; and means arranged to supply a signal representative of the output of said bridge circuit to said display means, thereby to display the thermal power exchanged with the fluid between said spaced locations, said magnetic field generating means having pole pieces on opposite sides of said conduit and being arranged to energize said pole pieces with pulses of magnetic flux, each pulse having a portion corresponding to constant field current, the heat meter comprising means arranged to sample said output signal during said constant pulse portion and to hold said sample until said pole pieces are next pulsed.

8. A heat meter comprising conduit means of circular cross section having a measurement section of rectanuglar cross section arranged to convey fluid, means arranged to obtain a measurement representative of rate of flow of fluid in said conduit means, means arranged to obtain a measurement representative of difference in temperature of the fluid between two spaced locations within said conduit means, and means arranged to apply as an input signal to said temperature difference measurement means a signal that is representative of the output signal of said flow rate measurement means, whereby an output signal obtained from said temperature difference measurement means is representative of the amount of heat exchanged with the fluid between said two spaced locations, said temperature measurement means comprising temperature-sensitive resistance means, said flow rate measurement means comprising means for generating a substantially unidirectional magnetic field across said rectangular section of said conduit, a pair of planar electrodes mounted in said rectangular section of the conduit to extend parallel to said magnetic field and to a wall of said rectangular section, means to supply current through the temperature-sensitive resistance means that is proportional to the voltage induced between said electrodes.

9. A heat meter according to claim 8, comprising means arranged to energise the magnetic field intermittently.

10. A heat meter according to claim 8, wherein said temperature-sensitive resistance means is arranged to form part of a Wheatstone Bridge circuit, and wherein a signal representative of the output of said bridge circuit is supplied to display means, thereby to display the thermal power exchanged with the fluid between said spaced locations.

11. A heat meter according to claim 8, wherein said temperature-sensitive resistance means comprises two platinum film sensors arranged in a Wheatstone bridge circuit.

* * * * *